United States Patent
Wang et al.

(10) Patent No.: US 6,844,278 B2
(45) Date of Patent: Jan. 18, 2005

(54) DENSE LEAD-FREE GLASS CERAMIC FOR ELECTRONIC DEVICES

(75) Inventors: Liwu Wang, San Diego, CA (US); Xiang-Ming Li, San Diego, CA (US); Albert Tian, San Diego, CA (US); Daniel H. Chang, Rancho Sante Fe, CA (US); Zhong Zheng, City of Industry, CA (US)

(73) Assignee: AEM, Inc., San Diego, CA (US)

( * ) Notice: Subject to any disclaimer, the term of this patent is extended or adjusted under 35 U.S.C. 154(b) by 105 days.

(21) Appl. No.: 10/246,847

(22) Filed: Sep. 18, 2002

(65) Prior Publication Data

US 2003/0096692 A1 May 22, 2003

Related U.S. Application Data

(60) Provisional application No. 60/323,516, filed on Sep. 18, 2001.

(51) Int. Cl.[7] .......................... C03C 14/00; C03C 8/22; C03C 8/02; C03C 8/14
(52) U.S. Cl. ............................. 501/32; 501/16; 501/17; 501/21
(58) Field of Search ............................. 501/16, 17, 21, 501/32; 428/209, 432

(56) References Cited

U.S. PATENT DOCUMENTS

| | | | |
|---|---|---|---|
| 3,926,648 A | | 12/1975 | Miller |
| 4,642,148 A | * | 2/1987 | Kurihara et al. ......... 156/89.18 |
| 4,755,490 A | | 7/1988 | DiLazzaro |
| 4,879,261 A | | 11/1989 | Burn |
| 5,316,985 A | * | 5/1994 | Jean et al. ..................... 501/16 |
| 5,491,118 A | * | 2/1996 | Hormadaly ................... 501/20 |
| 5,747,396 A | | 5/1998 | Miyakoshi et al. |
| 5,866,240 A | * | 2/1999 | Prabhu et al. ............... 428/210 |
| 6,004,894 A | * | 12/1999 | Faust et al. .................... 501/17 |
| 6,008,151 A | | 12/1999 | Sasaki et al. |
| 6,080,693 A | | 6/2000 | Maeda et al. |
| 6,121,173 A | | 9/2000 | Terashi |
| 6,228,788 B1 | | 5/2001 | Jean et al. |
| 6,255,239 B1 | * | 7/2001 | Sakoske ....................... 501/77 |
| 6,403,199 B2 | | 6/2002 | Mori et al. |
| 6,511,931 B1 | * | 1/2003 | Baldwin ....................... 501/16 |
| 6,602,616 B2 | * | 8/2003 | Sugimoto et al. ............ 428/688 |
| 2002/0098965 A1 | * | 7/2002 | Terashi et al. .................. 501/5 |
| 2004/0043885 A1 | * | 3/2004 | Hormadaly ................... 501/32 |

* cited by examiner

Primary Examiner—Karl Group
Assistant Examiner—Elizabeth A. Bolden
(74) Attorney, Agent, or Firm—Liu & Liu

(57) ABSTRACT

A dense lead-free glass ceramic that has low dielectric constant and low dielectric loss for producing high-frequency ceramic devices, such as inductors and low temperature co-fired ceramics (LTCC), is disclosed. The glass ceramic consists of 15–35% by weight of lead-free borosilicate glasses with low softening point, 15–35% by weight of lead-free borosilicate glasses with high softening point, 20–80% by weight of combination of amorphous and crystalline $SiO_2$-filler (preferably 5–30% by weight of amorphous $SiO_2$, 10–50% by weight of crystalline $SiO_2$) and 0.1–10% by weight of at least one oxide of $Al_2O_3$, BaO, $Sb_2O_3$, $V_2O_5$, CoO, MgO, $B_2O_3$, $Nb_2O_5$, SrO and ZnO. The glass ceramic can be densified up to 99% of its theoretical density after firing and is co-firable with conductive metals between 800–900° C. The dense glass ceramic has dielectric constant of 4.2–4.6 and loss tangent (tan δ)<0.0025 at 20 MHz and good thermal/mechanical strength for application in high frequency electronic devices.

19 Claims, 2 Drawing Sheets

DENSE LEAD-FREE GLASS CERAMIC FOR ELECTRONIC DEVICES

This application claims the benefit of Provisional application No. 60/323,516 filed Sep. 18, 2001.

BACKGROUND OF THE INVENTION

1. Field of the Invention

The present invention relates generally to a composition for ceramic substrates, especially those having desirable dielectric and mechanical properties for application in high frequency ceramic devices. More specifically the present invention provides glass ceramic substrates for the manufacture of ceramic circuit components and modules as well as any other ceramic devices for microwave applications.

2. Description of Related Art

The increased volume of communication information transmitted in recent years has promoted the rapid development of various communication systems utilizing microwave bandwidth regions, such as cellular telephones, satellite communication and satellite broadcasting systems. Accompanying these communication system advances has been the development of various microwave dielectric materials to accommodate the industry's needs. Such advances in wireless applications are highly dependent upon improvements in microwave materials and new developments in processing methods for microwave components and devices.

In general, microwave applications require dielectric materials which have low dielectric constants and low dielectric loss (indicated by a low dielectric loss factor) in order to increase the Q factor (the inverse of the dielectric loss factor) and minimize energy absorption by the dielectric material that would reduce resonant signal intensity. Accordingly, a relatively lower loss factor results in a relatively higher Q factor. Additionally materials with a lower dielectric constant, and lower dielectric loss factor (high Q factor), are essential in order to maintain the physical dimensions of the electronic devices in a range conducive to manufacturing limitations. Glass ceramic is one of the best candidates as a substrate material for microwave electronic components and devices because of its excellent comprehensive properties.

The dielectric properties of glass ceramic are determined not only by its composition, but also by its sintered microstructure. Glass ceramic is usually produced by ceramic fillers that are mixed with glasses and then fired at a high temperature (Examples of glass ceramics include the borosilicate glasses with alumina system developed by Fujisu and the lead borosilicate glass with alumina system developed by Dupont). A fully densified glass ceramic microstructure is conducive to achieving a high Q factor and mechanical strength. Moreover, the reduced interactive layer thickness requires a fully dense interlayer of insulator (glass ceramic) to avoid shorting any conductive circuits.

Many efforts have been made in order to develop glass ceramic dielectric materials for microwave application (see U.S. Pat. No. 6,403,199, U.S. Pat. No. 3,926,648, U.S. Pat. No. 6,121,173, U.S. Pat. No. 4,642,148, U.S. Pat. No. 6,080,693, U.S. Pat. No. 4,879,261, U.S. Pat. No. 6,228,788, U.S. Pat. No. 4,755,490, and U.S. Pat. No. 5,747,396).

For example, U.S. Pat. No. 6,228,788 describes a ceramic composition for producing high-frequency ceramic inductors, which can be densified up to 95% at temperatures between 800–1000° C. The composition consists of: (a) 20–80% by weight of a borosilicate glass comprising 10–14% by weight of $B_2O_3$, 90–80% by weight of $SiO_2$, 0.1–4% by weight of $Al_2O_3$ and 0.1–4% by weight of alkali metal oxides; and (b) 80–20% by weight of a filler of $Al_2O_3$. While this glass ceramic can be well densified, the dielectric constant of such material is about 6, which is too high for microwave applications. In general, the dielectric constant is not low enough for microwave applications in substrates in which $Al_2O_3$ is used as filler.

In another example, U.S. Pat. No. 5,747,396 discloses a glass ceramic composition using a single borosilicate glass having a low softening point and silica as a filler. While the invention of this patent addressed a manufacturing problem that originated from borosilicate glass because of its unstable composition of $B_2O_3$, and reduces the dielectric constant of the resulting substrate to about 5.3, the material is not able to be adequately densified. For glass ceramic, which is a mixture of glass and ceramic powders, the sintering kinetics are controlled by the viscous flow of low softening point glass, because more than half the volume percent of glass is present in the glass ceramic mixture. By using a glass with low softening point, the viscous flow of the molten glassy phase will form a closed glassy phase network very quickly. Consequently, the gases will be trapped within the glass network and leave a porous matrix in the intermediate and final densification stages. As such, the glass ceramic substrate is not fully densified.

Finally, in recent years the electronic industry as a whole has been moving to lead-free assembly processes for environmental and market concerns. Though lead is one of the oldest known materials used by man, recent studies have shown that lead which accumulates in the body can lead to brain, liver and kidney damage. Although the electronics industry accounts for less than 1% of the annual lead consumption, the main drive for its elimination is the risk that lead can seep from land-fill dumps of electronic waste to the ground water.

It is therefore desirable to provide an improved composition for forming fully densified lead-free ceramic substrates having desirable dielectric properties which overcomes the drawbacks in the prior art.

SUMMARY OF THE INVENTION

The present invention overcomes the drawbacks of the prior art glass ceramic compositions by using two different kinds of borosilicate glasses in a lead-free ceramic dielectric substrate that can be fully densified at low temperatures.

According to one aspect of the present invention, the glass ceramic composition comprises 30–70% by weight of a combination of two different kinds of borosilicate glasses in order to improve the densification of the resultant substrate. Further composition elements include 20–80% by weight of a silica ($SiO_2$) filler, and 0.1–10% by weight of at least one oxide of $Al_2O_3$, BaO, $Sb_2O_3$, $V_2O_5$, CoO, MgO, $B_2O_3$, $Nb_2O_5$, SrO and ZnO. The glass ceramic can be densified up to 99% of its theoretical density and is co-firable with conductive metals at low temperature (generally between 800–900° C.).

According to another aspect of the present invention, the silica filler composition includes part amorphous silica such that the resultant substrate has a compatible coefficient of thermal expansion, and is co-firable with conductive metals such as silver and copper. It has been found that a composition of pure borosilicate glass and fused crystalline $SiO_2$ causes substrate deformation or crack generation near the conductor, particularly when inductors having an increased number of turns are fabricated because of large differences in thermal expansion between crystalline phase silica and the conductor material (reference is made to U.S. Pat. No. 6,008,151). In order to solve this problem, amorphous silica can be introduced into the silica composition. In the preferred embodiment, at least one third of the total silica component is amorphous silica. The advantages to using amorphous silica filler components versus an all-crystalline silica filler include: (a) the resulting sintered glass ceramic substrate has a lower dielectric constant and loss factor; (b) there is no inner conductive material [eg. silver (Ag)] diffusion in the resultant substrate; and (c) there is a reduced mismatch of thermal expansion coefficients between the glass ceramic and conductive materials during sintering effectively eliminating any deformation or cracking in the glass ceramic substrate during sintering.

In yet another aspect of the present invention, the two different kinds of borosilicate glasses have different softening points to improve the densification of glass ceramic during sintering. One borosilicate glass component preferably has a softening point of 600 to 800° C. and the other preferably has a softening point of 700 to 850° C. By using an optimized combination of two kinds of glass powder, the composition can be well sintered with an apparent density of at least 95%.

In still a further aspect of the present invention, the volume portion of the two different kinds of borosilicate glasses can be adjusted according to dielectric properties of the glasses and the densification requirement. According to the preferred embodiment of the present invention, the ceramic composition consists of 15–35% by weight of borosilicate glasses with a low softening point, and 15–35% by weight of borosilicate glasses with a high softening point.

According to yet another aspect of the present invention, the provided borosilicate glasses with low and high softening point are lead free. It is an object of the present invention to provide a highly dense lead-free glass ceramic.

In still a further aspect of the present the invention, the mean particle size and specific surface area of raw materials such as glasses and silica powders are optimized in order to produce a fully densified glass ceramic. In the preferred embodiment, the borosilicate glasses and silica powders have a mean particle size and specific surface area of approximately 0.5–5.0 microns and 2–10 $m^2/g$, respectively.

According to the invention, 0.1–10% by weight of at least one oxide of $Al_2O_3$, BaO, $Sb_2O_3$, $V_2O_5$, CoO, MgO, $B_2O_3$, $Nb_2O_5$, SrO and ZnO is required for reducing the dielectric constant and for increasing the flexural strength of sintered glass ceramic.

DETAILED DESCRIPTION OF THE PREFERRED EMBODIMENT

Figure 1:
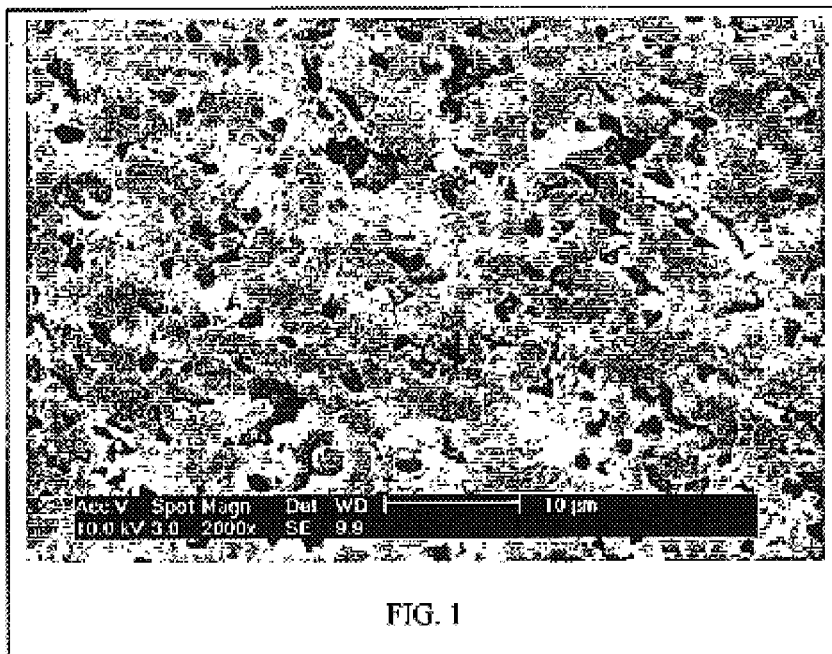
FIG. 1 illustrates the microstructure of glass ceramic using a single borosilicate glass.

This invention is described in a preferred embodiment in the following description. The detail of the present invention is also best explained by reference to certain examples. While this invention is described in terms of the best mode of achieving this invention's objectives, it will be appreciated by those skilled in the art that variations of the presented description and examples may be accomplished in view of these teachings without deviating from the spirit or scope of the invention.

The present invention provides for both the increased mechanical strength and Q factor of glass ceramic substrates as described below. Though utility can be found in many aspects of the present invention, of particular significance is the use of two different borosilicate glasses in the glass ceramic composition as a means to improve densification. Additionally, the use of amorphous silicate in the ceramic filler enables the glass ceramic substrates to be simultaneously sintered with high conductivity metals.

The volume portion of the two different kinds of borosilicate glasses can be adjusted according to the desired dielectric properties of the glasses and the densification requirements in resultant substrates. Both types of glasses preferably work as a liquid phase during sintering to form a matrix surrounding the ceramic filler. The liquid phase is desirable since ceramic fillers have low reactivity with glass and often suffer difficulties in forming a dense glass ceramic which drastically reduces the density and strength of the resultant substrate. Furthermore, the glass ceramic is usually sintered at a low temperature in a short time (generally one to three hours). In a viscous flow controlled sintering process using only a single glass, it is extremely difficult to select an appropriate softening point of the glass to produce fully densified glass ceramic substrates. For instance, if the softening point of glass is too high, it is difficult to increase the density of the composition for low temperature sintering. On the other hand, if the softening point is too low, the viscous flow of the molten glassy phase will form a closed glassy phase network very quickly, leaving a porous matrix. The following examples demonstrate how densification of a glass ceramic substrate can be drastically improved using two kinds of glasses having different softening points.

In the following examples, $SiO_2$ (type 1) is crystalline phase silica and $SiO_2$ (type 2) is amorphous phase silica. Glass (type 1) is a glass material with a high softening point (700 to 850° C.) and glass (type 2) is a-glass material with a low softening point (600 to 800° C.). The processes for making glass ceramic substrates and multilayer glass ceramic compacts are well known in the art. Such processes can be adapted to form substrates and devices using the two-glass composition of the current invention. It will be appreciated by those skilled in the art that many variations to the below described process steps are possible given the disclosure of the current invention. For example, a description of single glass ceramic fabrication processes for use in electronic devices can be found in U.S. Pat. No. 6,228,788, which is hereby incorporated by reference as if fully set forth herein. Such a process can be modified to use two different glasses to form glass ceramic substrates and multilayer glass ceramic compacts according to the current invention.

EXAMPLE I

A glass ceramic composition having the following formula was prepared:

$Al_2O_3$: 1.1 grams, BaO: 0.05 grams, ZnO: 1.8 grams, $Sb_2O_3$: 0.05 grams $SiO_2$ (type 1): 16.9 grams, $SiO_2$ (type 2): 18.5 grams Glass (type 1): 27.2 grams, Glass (type 2): 34.4 grams Surfactant: 2 grams Alcoholic solvent: as needed The composition was homogenized in a Sweco mill with high density $Al_2O_3$ balls as grinding media for 12 hours.

Fish oil was used as surfactant to destroy the agglomeration of the powder. The resultant mixed slurry was filtered through a screen of 200 mesh and dried at 80 degrees C. for 24 hours. The dried powder was then ground with a mortar and pestle and filtered through a screen of 60 mesh. The resultant mixed powder has a mean particle size and specific surface area of approximately 0.5–2 microns and 2–8 m²/g, respectively. 2.5 grams of the resultant dried powder was pressed into a disc with a diameter of 20 mm and height of about 2 mm at pressure of 4000 pounds. The disc was sintered at 880 degree C. for 60 minutes.

The oxide components ($Al_2O_3$, BaO, ZnO, $Sb_2O_3$) generally perform a function of adjusting the dielectric and mechanical properties of resultant glass ceramic substrate. In general any of $Al_2O_3$, BaO, $Sb_2O_3$, $V_2O_5$, CoO, MgO, $B_2O_3$, $Nb_2O_5$, SrO, ZnO, mixtures thereof, or various other oxides can be used in the formation of glass ceramic substrates according to the current invention.

In the present example, and according to the present invention, Glass (type 1) is a lead free borosilicate glass having the composition Si—B—Al—Ba with a softening point of 700–850 degree C. Glass (type 2) in the present example is a lead free borosilicate glass having the composition Si—B—Al—Ba with a softening point of 600–800 degree C. In general, compositions containing 15–35% of Glass (type 1) and 15–35% by weight of Glass (type 2) will produce a glass ceramic substrate with densification of at least 95%. It will be understood and appreciated by those skilled in the art that the volume portion of the two different kinds of borosilicate glasses can be adjusted according to the desired dielectric properties of the glasses and the densification requirement in the resultant substrate.

EXAMPLE II

Another glass ceramic composition having the following formula was prepared:

$Al_2O_3$: 2.2 grams, BaO: 0.05 grams, ZnO: 1.9 grams, $Sb_2O3$: 0.05 grams $SiO_2$ (type 1): 17.9 grams, $SiO_2$ (type 2): 21.2 grams Glass (type 1): 25.3 grams, Glass (type 2): 31.4 grams Surfactant: 2 grams, Binder: 25 grams Alcoholic solvent: as needed The composition was homogenized in a two-roll mill with high density $Al_2O_3$ balls as grinding media for 12 hours first without the binder material. The slurry was further milled for 12 hours after adding the binder. The slurry was treated for degassing by slow rolling it for 24 hours after filtering through a 200 mesh screen. Using the above composition, a multilayer ceramic compact can be fabricated as follows: (1) Coating the slurry to form a green film sheets with thickness of 20–40 micron; (2) Laminating together the green film sheets to form a multilayer ceramic green compact; (3) Punching the multilayer ceramic green compact to form a disc; (4) Burning out the binder in the multilayer ceramic green compact; (5) Firing the binder free multilayer ceramic green compact in air at 900 degree C. for 60 minutes.

In the present example, and according to the present invention, Glass (type 1) is a lead free borosilicate glass having the composition Si—B—Al—Ba with a softening point of 700–850 degree C. Glass (type 2) in the present example is a lead free borosilicate glass having the composition Si—B—Al—Ba with a softening point of 600–800 degree C. In reference to Table 1 below, relative fired densities of glass ceramic samples were measured by the water displacement method. The dielectric constant (K) and dielectric loss (tan δ) at 20 MHz were measured using impedance/materials analyzer HP 4291A with a dielectric test fixture HP 16453A. The relative densities of fired specimens indicate that the glass ceramic composition of the current invention is nearly fully densified at a low temperature that is suitable for co-firing with conductive metals such as silver. The glass ceramic composition of the present invention also has excellent dielectric properties in applications for microwave components and devices.

TABLE 1

| Sample | Sintering (degree C.) | Relative density (%) | K | tan δ |
|---|---|---|---|---|
| Example I | 880 | 99.12 | 4.54 | 0.0022 |
| Example II | 900 | 99.24 | 4.11 | 0.0024 |

Figure 2:
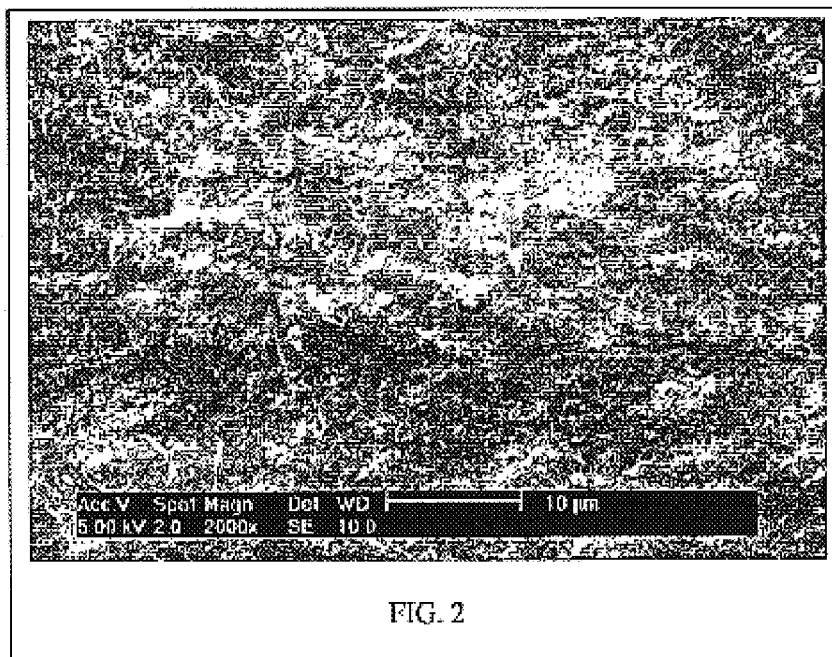
FIG. 2 illustrates the microstructure of glass ceramic using two kinds of borosilicate glasses having different softening points.

The improved densification process of glass ceramic with two kinds of borosilicate glasses having different softening point can be further illustrated by the microstructure of substrate fractures. FIG. 1 is a scanning electron microscope (SEM) image of glass ceramic using a single borosilicate glass. As is shown, there are a many pores within the glass ceramic substrate due to the formation of a closed glassy phase network as described above. The composition of the present invention, with two kinds of borosilicate glasses having different softening points, results in a fully densified microstructure, as shown in FIG. 2.

Figure 3:
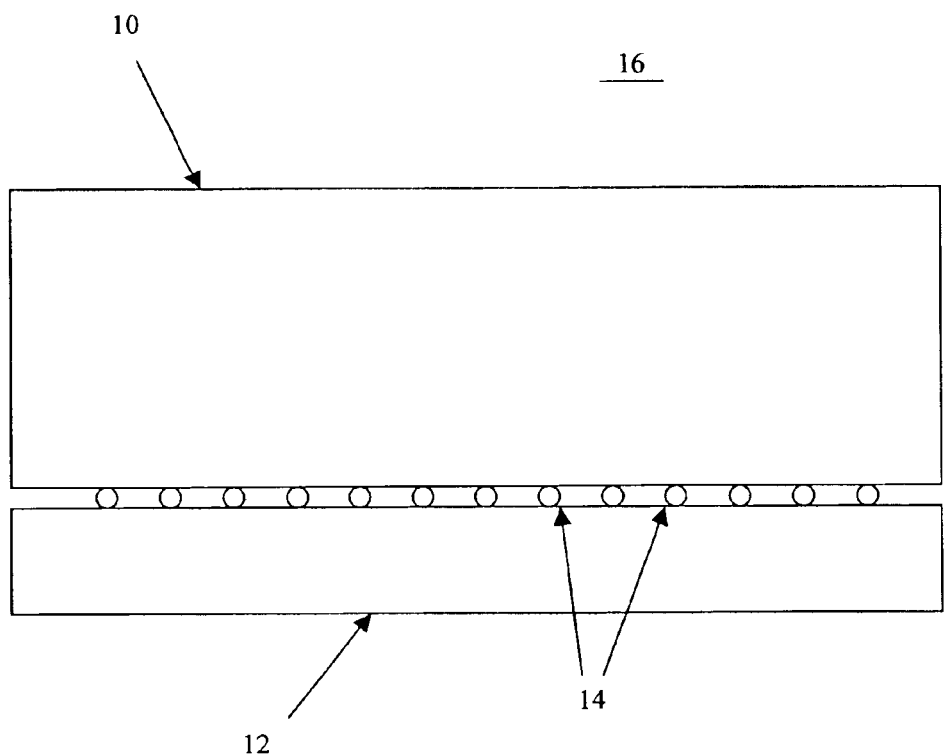
FIG. 3 illustrates a glass ceramic substrate of the current invention implemented in an electronic device.

The composition of the present invention may be implemented to form different types of microwave and electronic components, for use either standing alone, or integrated or combined with other passive and/or active components to form larger components, including but not limited to electrical devices, electronic devices, solid state devices, semiconductor device, opto-electronic devices (such as LCD displays), wireless devices, etc. For instance, FIG. 3 shows the glass ceramic substrate 12 of the present invention combined with an electronic chip 10 to form a high frequency electronic device 16. Conductive elements 14 facilitate the connection between glass ceramic substrate 12 and electronic chip 10. Additional conductive elements (not shown) may also be fabricated within glass ceramic substrate 12 to facilitate electronic functions within substrate 12. It is contemplated that glass ceramic substrate 12 could itself form an electronic chip or device using a combination of conductive elements and electronic components fabricated on or within substrate 12 without departing from the spirit or scope of the present invention. It is also understood that the present invention may be implemented to produce many different types of devices without departing from the scope and spirit of the present invention.

While the present invention has been described with respect to the preferred embodiments for achieving this invention's objectives, it will be apparent to those in the skilled art that various modifications and improvements may be made without departing from the scope and spirit of the invention. For example, it can be appreciated that the invented glass ceramic composition using two glasses having different softening points can be performed by using glasses and fillers of widely different compositions without departing from the scope and spirit of the present invention. Additionally, it is contemplated that compositions using more than two glasses may result in substrates having similar desirable characteristics to those disclosed herein. Accordingly, the disclosed embodiments are to be considered merely as illustrative of the invention.

What is claimed is:

1. A glass ceramic composition, comprising:

at least two glass materials having different softening points; and a ceramic material, wherein said glass materials comprise 15–35% by weight of a first glass material and 15–35% by weight of a second glass material, said ceramic material comprises 5–30% by weight of a first silica material, and 10–50% by weight of a second silica material, and said oxide comprises 0.1–10% by weight of at least one oxide.

2. A glass ceramic composition as in claim 1, wherein said glass materials are lead-free glass materials.

3. A glass ceramic composition as in claim 2, wherein said first glass material comprises a first borosilicate glass component and said second glass material comprises a second borosilicate glass component.

4. A glass ceramic composition as in claim 3, wherein said first borosilicate glass component has a first softening point and said second borosilicate glass component has a second softening point.

5. A glass ceramic composition as in claim 4, wherein said second softening point is higher than said first softening point.

6. A glass ceramic composition as in claim 4, wherein said first softening point is in the range of 600 to 750° C.

7. A glass ceramic composition as in claim 4, wherein said second softening point is in the range of 700 to 850° C.

8. A glass ceramic composition as in claim 1, wherein the oxide is selected from the group consisting of: $Al_2O_3$, BaO, $Sb_2O_3$, $V_2O_5$, CoO, MgO, $B_2O_3$, $Nb_2O_5$, SrO, ZnO, and mixtures thereof.

9. A glass ceramic composition as in claim 1, wherein said composition can be densified to at least 95% of its theoretical density at temperatures between 800–900° C.

10. A glass ceramic composition as in claim 1, wherein the glass ceramic composition has a dielectric constant of between 4.2 and 4.6 and a loss tangent of less than 0.0025 at 20 MHz.

11. A glass ceramic composition as in claim 1, wherein said glass materials and ceramic materials have a mean particle size and specific surface area of 0.5 to 5.0 microns, and 2 to 10 square meters per gram, respectively.

12. An electronic device, comprising:

a glass ceramic substrate having a glass ceramic composition as in claim 1;

conductive elements implemented on said glass ceramic substrate; and an electronic circuit formed to said conductive elements of said glass ceramic substrate.

13. An electronic device as in claim 12 wherein said electronic device is of the type used in high frequency applications.

14. An electronic device as in claim 12, wherein said electronic device is a microwave device.

15. A method of making a glass ceramic substrate for application in electronic devices comprising the steps of:

providing a glass ceramic composition as in claim 1; and forming a glass ceramic substrate using said glass ceramic composition.

16. A glass ceramic composition as in claim 1, wherein said first silica material comprises amorphous $SiO_2$ and second silica material comprises crystalline $SiO_2$.

17. A glass ceramic composition as in claim 16, wherein said first silica material comprises 5–30% by weight of amorphous $SiO_2$ and said second silica material comprises 10–50% by weight of crystalline $SiO_2$.

18. A glass ceramic composition as in claim 1, wherein the first glass material has a first softening point in the range of 600 to 750° C.

19. A glass ceramic composition as in claim 1, wherein the second glass material has a softening point in the range of 700 to 850° C.

* * * * *